US008584342B2

(12) United States Patent
Dunmire et al.

(10) Patent No.: US 8,584,342 B2
(45) Date of Patent: Nov. 19, 2013

(54) METHOD FOR RETAINING LUBRICATION FOR LIFE EXTENSION IN EXISTING SPLINED JOINT (75) Inventors: Christopher F. Dunmire, Palos Verdes Estates, CA (US); Trung N. Tran, Torrance, CA (US); Christopher L. Scott, Los Alamitos, CA (US)

(73) Assignee: Honeywell International, Inc., Morristown, NJ (US)

( * ) Notice: Subject to any disclaimer, the term of this patent is extended or adjusted under 35 U.S.C. 154(b) by 1422 days.

(21) Appl. No.: 12/031,427

(22) Filed: Feb. 14, 2008

(65) Prior Publication Data
US 2008/0214315 A1 Sep. 4, 2008

Related U.S. Application Data (62) Division of application No. 11/103,973, filed on Apr. 12, 2005, now Pat. No. 7,354,216.

(51) Int. Cl.
*B21D 39/00* (2006.01)
*B23P 11/00* (2006.01)

(52) U.S. Cl.
USPC .......... 29/521; 29/434; 403/359.1; 464/7

(58) Field of Classification Search
USPC ......... 403/359.1, 359.5, 359.6, 288; 277/637, 277/645, 560; 464/7, 164; 29/434, 521, 235
See application file for complete search history.

(56) References Cited

U.S. PATENT DOCUMENTS

| 3,123,990 A | 3/1964 | Freeman |
| 3,337,221 A | 8/1967 | Hulsebus et al. |
| 3,801,241 A | 4/1974 | Martin et al. |
| 3,813,899 A | 6/1974 | Abrahamer |
| 3,940,948 A | 3/1976 | Schultenkamper |
| 3,942,336 A | 3/1976 | Schultenkamper |
| 3,961,869 A | 6/1976 | Droege, Sr. et al. |
| 4,003,669 A | 1/1977 | Fenske |
| 4,081,218 A | 3/1978 | Gabriel |
| 4,253,713 A | 3/1981 | Chambers |
| 4,281,942 A | 8/1981 | Gaeckle et al. |
| 4,358,695 A | 11/1982 | MacDonald et al. |
| 4,445,875 A | 5/1984 | Kosuda et al. |

(Continued)

FOREIGN PATENT DOCUMENTS

JP     11180259     7/1999

*Primary Examiner* — David Bryant
*Assistant Examiner* — Christopher Koehler
(74) *Attorney, Agent, or Firm* — Shimokaji & Assoc., PC (57) ABSTRACT A method for retaining lubrication in a splined joint comprises the steps of forming a seal between an inward surface of a grease seal cup and a first component, forming another seal between an outward surface of the grease seal cup and a sealing member extending from a second component, and engaging an end portion of the grease seal cup with an end portion of the first component, so that the end portion of the grease seal cup resists axial displacement of the grease seal cup during engagement of the first component with the second component. The grease seal cup of the method has a cylindrical portion integral with the end portion. The cylindrical portion has a tapered annular wall with the inward and outward surfaces. The end portion of the grease seal cup extends radially and inwardly from the cylindrical portion, so that the tapered annular wall is squeezed between the first component and the sealing member. The pre-fabricated light weight grease seal cup can be used in existing splined joints without adversely affecting the weight balance.

6 Claims, 6 Drawing Sheets

(56) References Cited

U.S. PATENT DOCUMENTS

| | | |
|---|---|---|
| 4,543,038 A | 9/1985 | Kitaguchi |
| 4,600,032 A | 7/1986 | Heyl |
| 4,730,550 A | 3/1988 | Bramstedt et al. |
| 4,834,627 A | 5/1989 | Gannaway |
| 4,945,745 A | 8/1990 | Bathory |
| 5,078,533 A | 1/1992 | Madonio |
| 5,160,149 A | 11/1992 | Winn |
| 5,244,215 A | 9/1993 | Cather et al. |
| 5,647,597 A * | 7/1997 | Grochowski ............ 277/551 |
| 5,725,431 A | 3/1998 | Reynolds |
| 5,807,072 A | 9/1998 | Payling |
| 5,813,829 A | 9/1998 | Mazzotta |
| 5,816,784 A | 10/1998 | Postuchow et al. |
| 5,853,177 A * | 12/1998 | Brissette et al. ............ 277/551 |
| 6,347,529 B1 | 2/2002 | Yamamoto |
| 6,431,786 B2 | 8/2002 | Fabbri et al. |
| 6,467,819 B2 | 10/2002 | Seifert et al. |
| 6,863,613 B2 * | 3/2005 | Jackson et al. ............ 464/16 |
| 2003/0159536 A1 * | 8/2003 | Bergkvist et al. ............ 74/492 |
| 2004/0092320 A1 * | 5/2004 | Lentini et al. ............ 464/133 |
| 2005/0123347 A1 * | 6/2005 | Yokoya et al. ............ 403/359.1 |

* cited by examiner

METHOD FOR RETAINING LUBRICATION FOR LIFE EXTENSION IN EXISTING SPLINED JOINT

CROSS-REFERENCE TO RELATED APPLICATIONS

This application is a divisional application of Ser. No. 11/103,973 filed Apr. 12, 2005.

GOVERNMENT INTERESTS

The invention was made with Government support under contract number F33657-91-C-0006 awarded by Boeing Military Aircraft and is subject to the provisions of that contract. The Government has certain rights in this invention.

BACKGROUND OF THE INVENTION

The present invention generally relates to splined joints and, more particularly, to grease seal cups to retain lubrication for life extension in existing splined joints.

Splined joints are used in many devices for transmitting torque between two components, such as a motor drive shaft and compressor shaft. Generally, a splined joint includes a series of internal splines formed on one of the components engaging a series of external splines formed on the other of the two components. Typically, a splined joint is assembled by positioning the two components end-to-end lengthwise so that the internal splines are circumferentially aligned with the spaces between the external splines and then sliding the components axially into overlapping engagement so that the two sets of splines become enmeshed with one another.

A lubricating material, such as grease, may be provided at the interface of the internal and external splines to reduce component wear. During component operation, the lubricating material tends to be removed from the spline interface due to centrifugal force. Additionally, some splined joints are exposed to materials, such as hot hydraulic fluid, which also tend to remove the grease that is intended to lubricate the splines. Without lubrication, the splines wear out prematurely and limit the component service life. For some applications, the loss of spline joint lubrication has limited component service life to ¼-life.

U.S. Pat. No. 4,281,942 provides a lubrication system for a spline connection. The described system comprises a split ring at one end of the spline connection and a supply of oil at the other end. During operation, centrifugal force pushes the two halves of the split ring apart, allowing the oil to flow through the spline connection and out through the split ring. A quad o-ring around the circumference of the split ring pulls the two halves together when the shaft is stationary, closing off the oil path. Although the disclosed system may provide lubrication for a spline connection, the added weight of the heavy metal split ring may not be suitable for some existing applications. For example, applications including a Scotch yoke design require the weight balance to be maintained and the incorporation of the heavy split ring may necessitate a total redesign. Additionally, this lubrication system does not sufficiently reduce lubrication loss due to hot hydraulic fluid exposure.

Japanese Patent No. JP11180259 provides a grease cup for a connecting shaft. The cup comprises a rigid washer positioned between a shaft and a rotary lever. The rigid washer is bent upward during assembly to suppress the outflow of grease from the area between the shaft and the lever and to prevent the inflow of water. Although the described grease cup may be used to reduce grease loss from the joint between a shaft and a lever, it may not have the symmetry necessary for use in a splined joint between two high-speed rotating shafts. Additionally, because the described cup is formed during installation by bending the washer, it may not be useful for applications requiring an easy to install pre-fabricated component.

As can be seen, there is a need for improved mechanisms to retain splined joint lubrication. A lightweight apparatus that can maintain the weight balance of an existing system is needed. Additionally, an apparatus is needed that is pre-fabricated and easy to install.

SUMMARY OF THE INVENTION

In one aspect of the present invention, an apparatus for a splined joint formed between a first component and a second component comprises a cylindrical portion having an inner diameter adapted to receive the first component; and an end portion radially inward from and integral to the cylindrical portion, the end portion having an opening adapted to receive the second component.

In another aspect of the present invention, an apparatus for a splined joint formed between a drive shaft and a driven shaft comprises a polymer cup-shaped structure having a cylindrical portion and an opening; and a seal cup cavity radially inward from the cylindrical portion.

In still another aspect of the present invention, an apparatus for a splined joint of a compressor comprises a cylindrical portion positioned radially outward from the splined joint and radially inward from a spanner nut of the compressor such that the splined joint is sealed.

In yet another aspect of the present invention, an assembly comprises a driven shaft having a plurality of external splines; a drive shaft having a plurality of internal splines in engagement with the external splines; and a grease seal cup positioned such that a cylindrical portion of the grease seal cup is radially outward from the drive shaft and radially inward from a sealing member of the driven shaft, said cylindrical portion forming a first seal with the drive shaft and forming a second seal with the sealing member.

In another aspect of the present invention, an apparatus for a splined joint formed between a hydraulic motor shaft and a compressor shaft comprises a cylindrical portion having an inner diameter adapted to receive the hydraulic motor shaft and having a tapered outward surface, the cylindrical portion having an axial length of between about 0.273 inches and about 0.283 inches, the cylindrical portion comprising polytetrafluoroethylene, the cylindrical portion adapted to form a first seal with the hydraulic motor shaft and to form a second seal with a spanner nut of the compressor shaft; and an end portion radially inward from and integral to the cylindrical portion, the end portion having an opening adapted to receive the compressor shaft, the end portion having a thickness of between about 0.025 inches and about 0.031 inches.

In a further aspect of the present invention, a method of joining a drive shaft and a driven shaft comprises the steps of applying a lubricant to the external splines of the driven shaft; passing the driven shaft through the opening of a grease seal cup to position the external splines within the seal cup cavity of the grease seal cup; and axially urging the drive shaft toward the driven shaft such that a splined joint is formed.

In yet another aspect of the present invention, a method of preventing loss of spline joint lubrication comprises the steps of forming a first seal between a grease seal cup and a first component of the spline joint; and forming a second seal between the grease seal cup and a sealing member of a second component of the splined joint.

These and other features, aspects and advantages of the present invention will become better understood with reference to the following drawings, description and claims.

BRIEF DESCRIPTION OF THE DRAWINGS

FIG. 2b is a cross-section view through line 2b of FIG. 2a;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides grease seal cups to retain lubrication for life extension in existing splined joints and methods for producing the same. The grease seal cups according to the present invention may find beneficial use in many industries including aerospace, watercraft, automotive, and electricity generation. The present invention may be beneficial in applications including power transmission for automobiles, aircraft and ships. This invention may be useful in any splined joint application.

In one embodiment, the present invention provides a grease seal cup for a splined joint that connects a first shaft to a second shaft. The first shaft, such as a hydraulic motor shaft, may have a plurality of internal splines. The second shaft, such as a compressor shaft, may have a plurality of external splines. Unlike the prior art, the grease seal cup may comprise a flexible polymer, such as Teflon®. The second shaft may be positioned through an opening in the bottom of the grease seal cup and the first shaft may be urged into engagement through the top of the grease seal cup. During the installation of the first shaft, the cylindrical portion of the grease seal cup may be squeezed between the outer surface of the first shaft and a component of the second shaft, such as a spanner nut, to seal the splined joint. The present invention may comprise a prefabricated cup-shaped apparatus that can be easily installed on the second shaft. This is unlike the prior art that requires washer bending during installation. Because the present invention may comprise a light weight polymer cup-shaped structure, it can be used in existing splined joints without adversely effecting the weight balance, which is also unlike the prior art.

Figure 1:
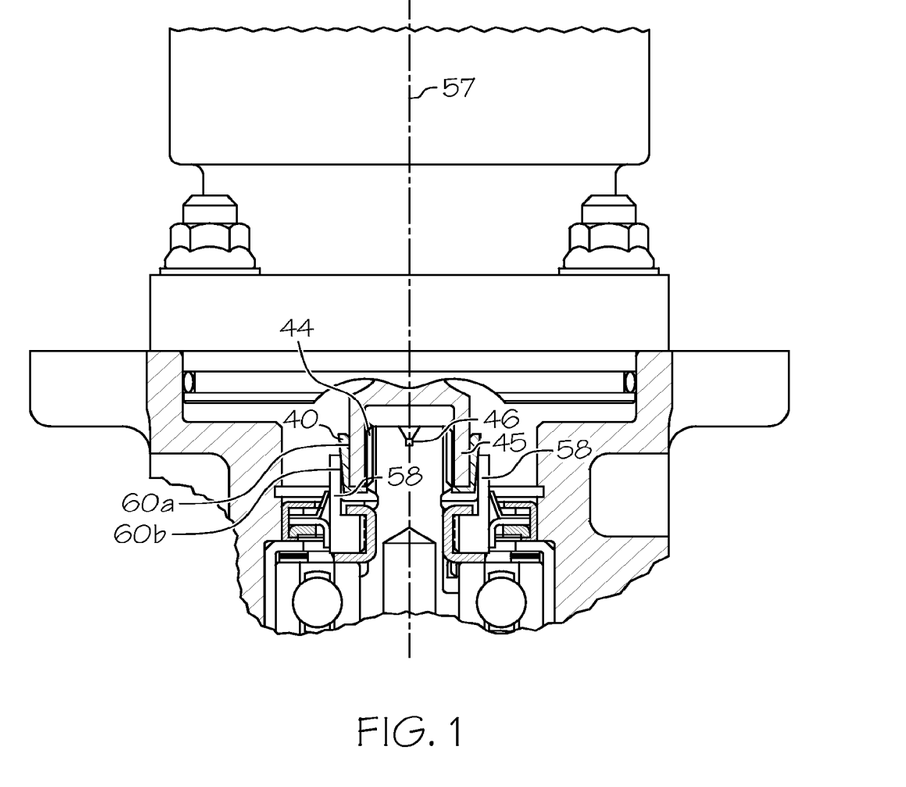
FIG. 1 is a partial cross section of a grease seal cup installation according to one embodiment of the present invention.

A grease seal cup installation of the present invention is depicted in FIG. 1. A grease seal cup 40 may be positioned radially outward from a splined joint 44. The splined joint 44 may include a series of internal splines 47 (see FIG. 3) formed on a first component 45 engaging a series of external splines 48 (see FIG. 3) formed on a second component 46. The grease seal cup 40 may form a first seal 60a with the first component 45 and form a second seal 60b with a sealing member 58. The sealing member 58 may be a structure of the second component 46 that is radially outward from the splined joint 44, such as a spanner nut.

Figure 2A:
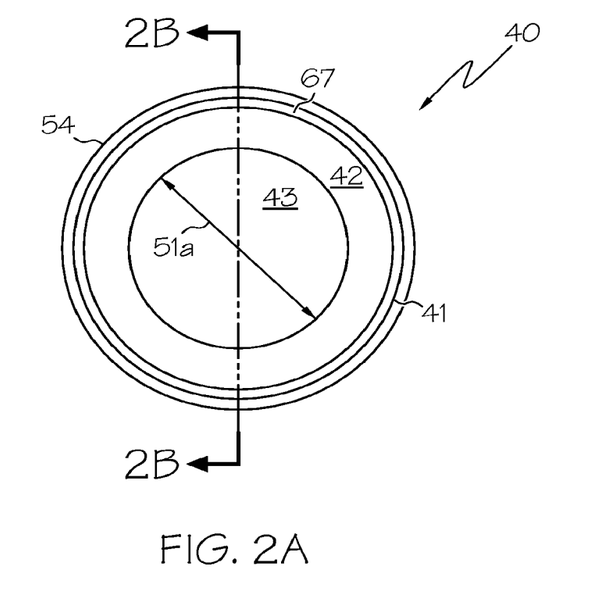
FIG. 2a is a top view of a grease seal cup according to one embodiment of the present invention.
Figure 2B:
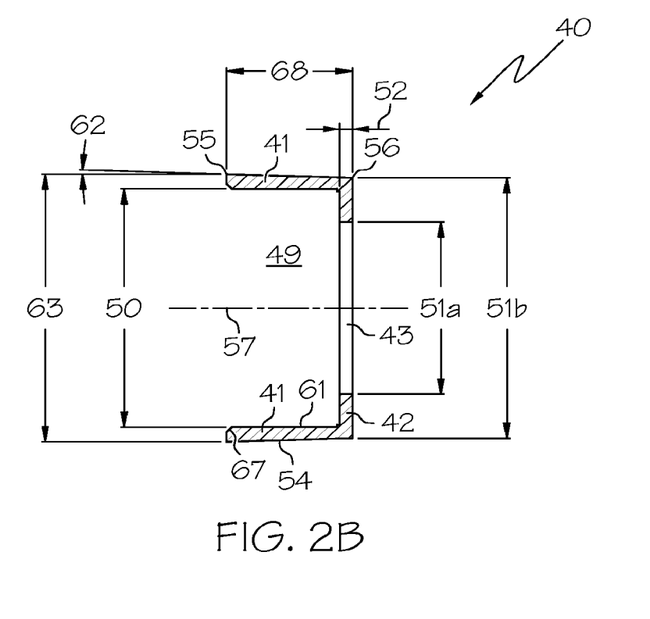

An embodiment of the grease seal cup 40 is depicted in FIGS. 2a and 2b. The grease seal cup 40 may comprise a cylindrical portion 41 and an end portion 42. The end portion 42 may comprise an annular shaped member having an opening 43 there through. The cylindrical portion 41 may be adapted to receive the first component 45. The opening 43 of an end portion 42 may be adapted such that the second component 46 may be passed through the opening 43 for grease seal cup installation. The end portion 42 may be radially inward from and integral to the cylindrical portion 41 such that the circumference of the end portion 42 is in contact with the cylindrical portion 41. Radially inward may be defined with reference to a longitudinal centerline 57 through the grease seal cup 40. The cylindrical portion 41 and the end portion 42 may define a seal cup cavity 49 for receiving the splined joint 44.

A diameter 51a of the opening 43, depicted in FIGS. 2a and 2b, may be adapted to receive the second component 46. In other words, the diameter 51a of the opening 43 may be such that at least a portion of the second component 46 may be passed through the opening 43 to position the external splines 48 within the seal cup cavity 49. The diameter 51a may vary with application and may depend on factors including the dimensions of the second component 46. For example, for some splined joint applications, the diameter 51a of the opening 43 may be between about 0.395 inches and about 0.405 inches. A diameter 51b of the end portion 42, depicted in FIG. 2b, may be such that the circumference of the end portion 42 is in contact with the cylindrical portion 41. A thickness 52 of the end portion 42 may vary with application and may depend on factors including the composition of the end portion 42. For some splined joint applications, the thickness 52 may be between about 0.025 inches and about 0.031 inches.

The cylindrical portion 41 may have a top end 55 and a bottom end 56, as depicted in FIG. 2b. The bottom end 56 may be integral to the end portion 42. The cylindrical portion 41 may extend axially from the bottom end 56 to the top end 55. An axial length 68 of the cylindrical portion 41 may vary with application and may depend on factors including the dimensions of the splined joint 44. For some applications, the axial length 68 of the cylindrical portion 41 may be about equal to the axial length of the splined joint 44. For some splined joint applications, the axial length 68 may be between about 0.273 inches and about 0.283 inches.

Figure 3:
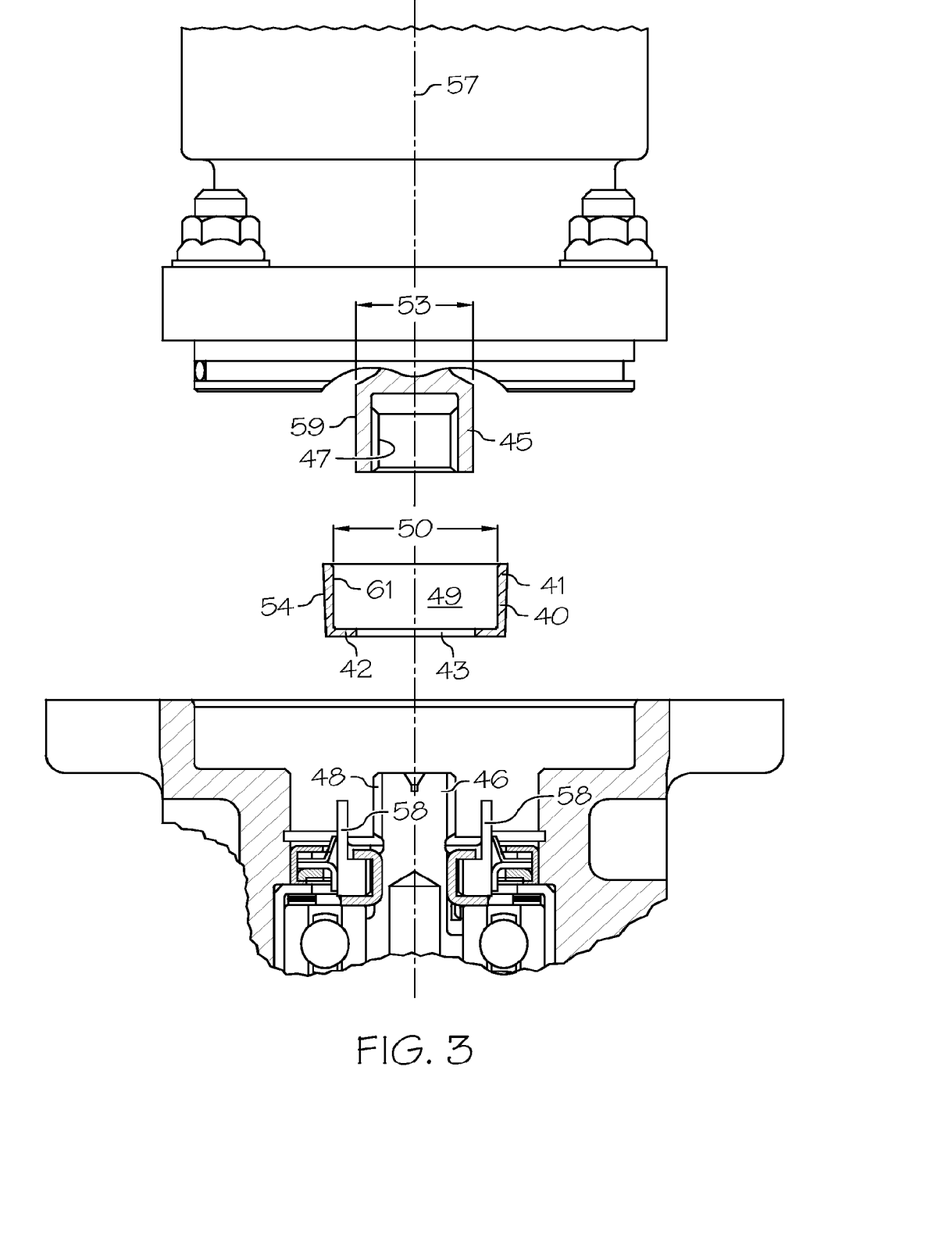
FIG. 3 is an exploded view of the grease seal cup installation of FIG. 1.

An inner diameter 50 of the cylindrical portion 41 may be adapted to receive the first component 45. The inner diameter 50 of the cylindrical portion 41 may be about equal to a first component outer diameter 53, as depicted in FIG. 3. For some splined joint applications, the inner diameter 50 of the cylindrical portion 41 may be between about 0.565 inches and about 0.575 inches.

As illustrated in FIG. 3, the cylindrical portion 41 of the grease seal cup 40 may have an inward surface 61 and an outward surface 54. The inward surface 61 may conform to an outer diameter surface 59 of the first component 45 (see FIG. 3). The outward surface 54 of the cylindrical portion 41 may be adapted such that the grease seal cup 40 may form the first seal 60a with the first component 45 and form the second seal 60b with the sealing member 58, as depicted in FIG. 1. The sealing member 58 may be a structure of the second component 46 that is radially outward from the splined joint 44, such as a spanner nut. The sealing member 58 may vary with application. For some applications, the sealing member 58 may comprise a spanner nut to retain the shaft seal and ball bearing in place.

Figure 4A:
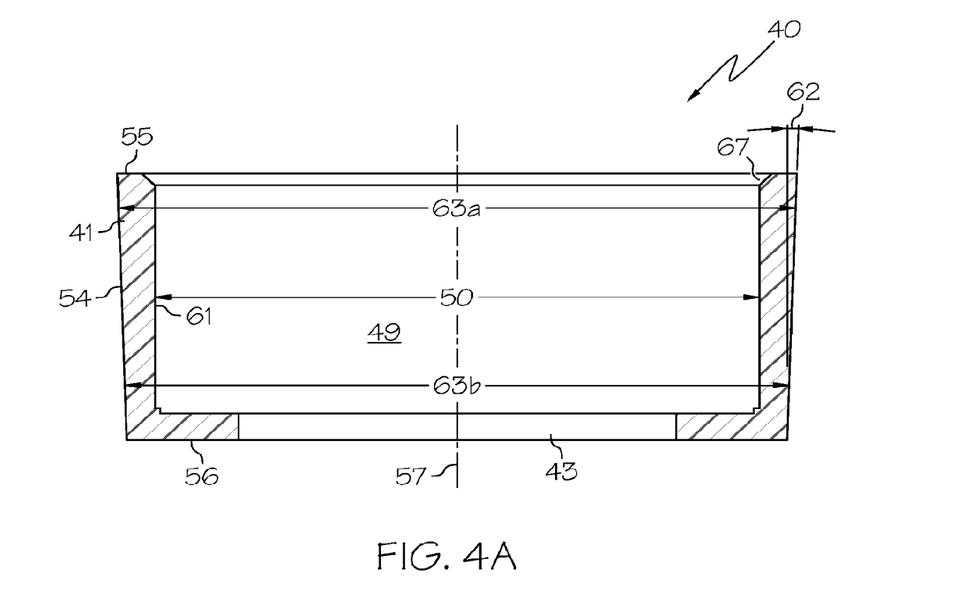
FIG. 4a is a cross-section view of a grease seal cup according to one embodiment of the present invention.
Figure 4B:
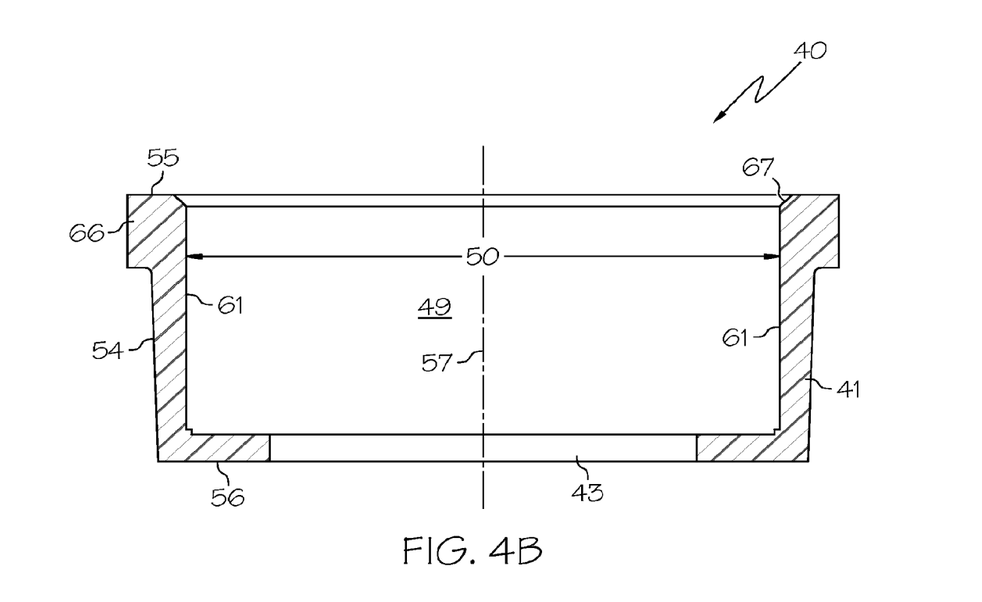
FIG. 4b is a cross-section view of a grease seal cup according to another embodiment of the present invention.
Figure 4C:
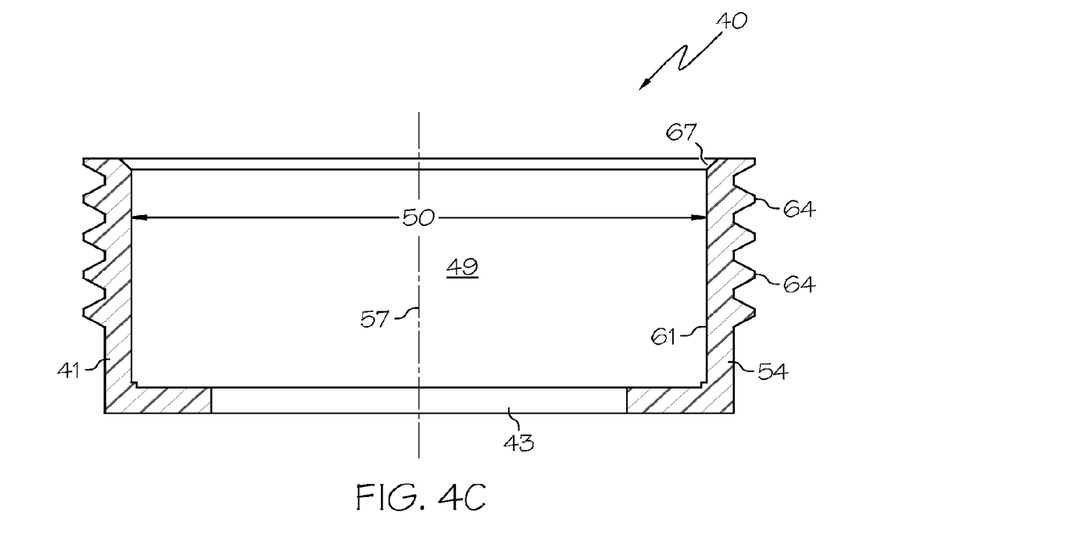
FIG. 4c is a cross-section view of a grease seal cup according to another embodiment of the present invention.
Figure 4D:
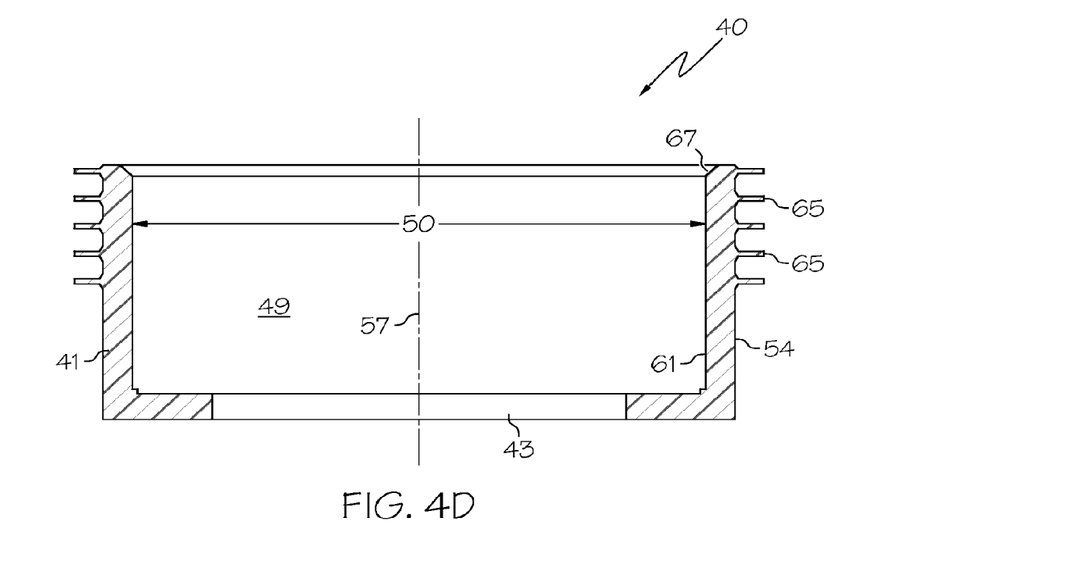
FIG. 4d is a cross-section view of a grease seal cup according to another embodiment of the present invention.

The outward surface 54 may be adapted such that the cylindrical portion 41 may be deformed during installation of the grease seal cup 40 to form the seals 60a,b (See FIG. 3). In one embodiment, the outward surface 54 may be at an angle 62 to provide a tapered shape wherein an outer diameter 63a of the cylindrical portion 41 towards the top end 55 is greater than an outer diameter 63b of the cylindrical portion 41 towards the bottom end 56, as depicted in FIG. 4a. In other words, the outward surface 54 may be tapered outward from the end portion 42. In an alternate embodiment, the outward surface 54 may comprise a flange 66 positioned towards the top end 55, as depicted in FIG. 4b. In other alternate embodiments, the outward surface 54 may comprise at least one radially extending projection. For example, a plurality of ridges 64 or ribs 65 may be positioned on the outward surface 54, as depicted in FIGS. 4c and 4d.

The outward surface 54 may comprise any outward surface that is tightly squeezed during the installation of the grease seal cup 40 to provide the seals 60a,b. The seals 60a,b may physically prevent materials from entering or exiting the splined joint 44. The seals 60a,b may prevent materials, such as hot hydraulic oil, from entering the splined joint 44. The seals 60a,b may prevent spline joint lubrication from being removed by centrifugal force during shaft operation.

The grease seal cup 40 may be installed by passing the second component 46 through the opening 43 to position the external splines 48 within the seal cup cavity 49. The first component 45 may be urged axially toward the second component 46 such that the splined joint 44 is formed. A chamfer 67 may be provided at the top end 55 of the inward surface 61 of the cylindrical portion 41 for ease of installation. The axial urging of the first component 45 may squeeze the cylindrical portion 41 between the outer circumference surface 59 of the first component 45 and the sealing member 58. The flexible deformation of the cylindrical portion 41 may provide the seals 60a,b.

The grease seal cup 40 may comprise a flexible polymer material. Useful flexible polymer materials may include polyamides, polyimides, elastomers, fluorocarbons, nylons, silicones, and polyvinyl and poly olefin compounds. Useful flurocarbons may include polytetrafluoroethylene (Teflon®). Polytetrafluoroethylene may be an inert polymer that may be useful for applications exposed to high temperatures and high pressures. Useful elastomers may include poly(vinylidine fluoridehexafluoropropylene) copolymer (Viton®). The grease seal cup 40 may be formed by conventional methods, such as machine cutting or moulding techniques. For grease seal cups 40 comprising more than one material, convention composite moulding techniques may be useful.

The first component 45 may comprise any shaft having internal splines 47. For example, the first component may comprise a drive shaft, such as a hydraulic motor drive shaft. The second component 46 may comprise any shaft having external splines 48. For example, the second component 46 may comprise a driven shaft, such as a compressor shaft.

Figure 5:
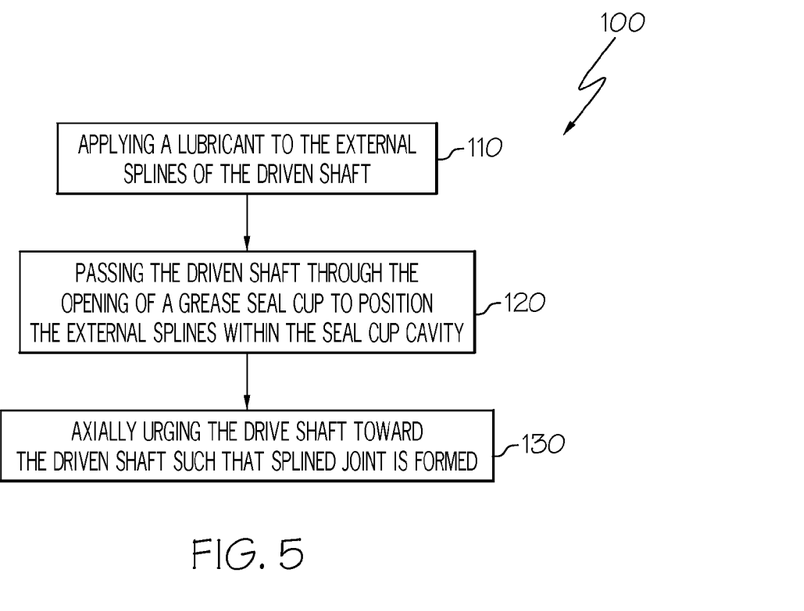
FIG. 5 is a flow chart of a method for joining a drive shaft and a driven shaft according one embodiment of the present invention.

A method 100 of joining a drive shaft and a driven shaft is depicted in FIG. 5. The method 100 may comprise a step 110 of applying a lubricant to the external splines of the driven shaft and a step 120 of passing the driven shaft through the opening of a grease seal cup to position the external splines within the seal cup cavity of the grease seal cup. The method 100 may comprise a step 130 of axially urging the drive shaft toward the driven shaft such that a splined joint is formed. The step 110 of applying a lubricant may comprise providing a grease to the surface of the external splines. The step 130 of axially urging may comprise squeezing the grease seal cup between an outer surface of the drive shaft and a spanner nut of the driven shaft.

Figure 6:
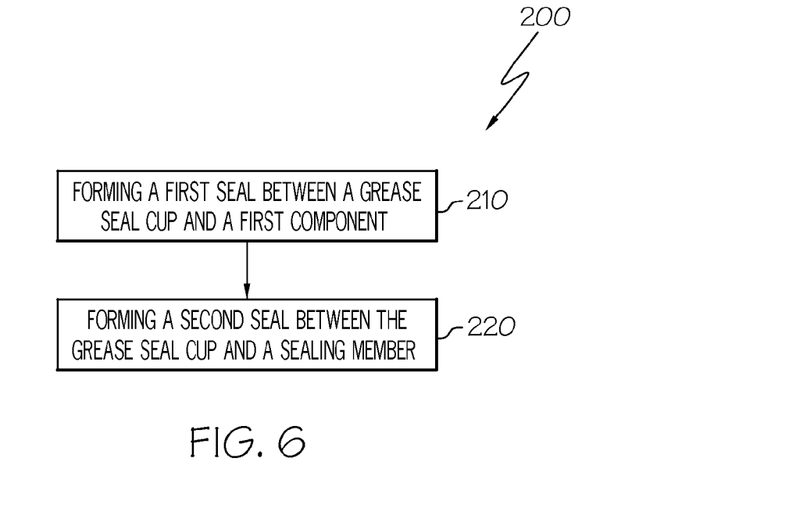
FIG. 6 is a flow chart of a method for preventing loss of spline joint lubrication according one embodiment of the present invention.

A method 200 of preventing loss of spline joint lubrication is depicted in FIG. 6. The method 200 may comprise a step 210 of forming a first seal between a grease seal cup and a first component of the spline joint, and a step 220 of forming a second seal between the grease seal cup and a sealing member of a second component of the splined joint. The step 210 of forming the first seal may comprise squeezing the cylindrical portion of the grease seal cup such that the inward surface of the grease seal cup contacts the outer circumference surface of the first component. The step 220 of forming the second seal may comprise squeezing the cylindrical portion of the grease seal cup such that the outward surface of the grease seal cup contacts a sealing member of the second component.

As can be appreciated by those skilled in the art, the present invention provides grease seal cups to retain lubrication in existing splined joints. The provided grease seal cups may comprise flexible polymer cups that may be easy to install. The grease seal cups may be used in existing applications having a Scotch yoke design without adversely affecting the weight balance.

It should be understood, of course, that the foregoing relates to exemplary embodiments of the invention and that modifications may be made without departing from the spirit and scope of the invention as set forth in the following claims.

We claim:

1. A method of joining a drive shaft and a driven shaft, the drive shaft having a first set of splines and the driven shaft having a second set of splines, comprising the steps of:
    applying a lubricant to a spline set selected from a group consisting of the first set of splines and the second set of splines;
    passing said driven shaft through an opening of a grease seal cup to position the first set of splines within a seal cup cavity of said grease seal cup;
    deforming a cylindrical portion of the grease cup by squeezing the cylindrical portion between an outer surface of the drive shaft and an inner surface of a sealing member that is fixedly attached to the driven shaft for rotation with the driven shaft; and
    forming a splined joint between the drive shaft and the driven shaft;
    wherein the steps of deforming the cylindrical portion of the grease cup and forming the splined joint are performed simultaneously with and as a result of passing said drive shaft through the opening in the grease cup seal.

2. The method of claim 1, wherein the step of forming the splined joint comprises
    axially urging the drive shaft toward the driven shaft, wherein the first set of splines is engaged with the second set of splines to form the splined joint.

3. The method of claim 1, wherein said step of applying a lubricant comprises providing a grease to the selected spline set.

4. The method of claim 1, wherein the first set of splines are external splines and the second set of splines are internal splines.

5. The method of claim 1, wherein the first set of splines are internal splines and the second set of splines are external splines.

6. The method of claim 1, wherein said grease seal cup is adapted to form a first seal with said drive shaft and a second seal with said sealing member.

* * * * *